United States Patent [19]
Stoll et al.

[11] Patent Number: 5,165,700
[45] Date of Patent: Nov. 24, 1992

[54] SEALING AND STRIPPER RING

[75] Inventors: Kurt Stoll, Esslingen; Herbert Köngeter, Reichenbach, both of Fed. Rep. of Germany

[73] Assignee: Festo KG, Esslingen, Fed. Rep. of Germany

[21] Appl. No.: 677,772

[22] Filed: Mar. 29, 1991

[30] Foreign Application Priority Data

Apr. 5, 1990 [DE] Fed. Rep. of Germany ....... 4010953

[51] Int. Cl.⁵ .................................................. F16J 15/32
[52] U.S. Cl. ........................................ 277/24; 277/33; 277/152
[58] Field of Search ............... 277/24, 33, 152, 205, 277/208, 211, 227; 92/168

[56] References Cited

U.S. PATENT DOCUMENTS

| | | | |
|---|---|---|---|
| 2,368,137 | 1/1945 | Harmon | 277/24 |
| 2,833,577 | 5/1958 | Reynolds | 277/24 |
| 3,049,370 | 8/1962 | Bertrand | 277/24 |
| 3,345,076 | 10/1967 | Wheelook | 277/24 |
| 3,477,730 | 11/1969 | Szcupak | 277/24 |
| 3,584,541 | 6/1971 | Cunningham | 92/168 X |
| 3,596,570 | 8/1971 | Kenyon | 92/168 |
| 4,039,197 | 8/1977 | Schmidt et al. | 277/24 |
| 4,243,232 | 1/1981 | Repella | |
| 4,280,741 | 7/1981 | Stoll | 277/152 X |
| 4,499,921 | 2/1985 | Stoll | 137/627.5 |
| 4,759,265 | 7/1988 | Stoll et al. | 277/24 X |

FOREIGN PATENT DOCUMENTS

| | | | |
|---|---|---|---|
| 8510866.9 | 6/1985 | Fed. Rep. of Germany. | |
| 1334849 | 7/1963 | France | 277/24 |
| 60762 | 5/1980 | Japan | 277/24 |
| 838213 | 6/1981 | U.S.S.R. | 277/24 |
| 876312 | 8/1961 | United Kingdom | 277/152 |
| 1059804 | 2/1967 | United Kingdom | 277/24 |
| 1518751 | 7/1978 | United Kingdom. | |

OTHER PUBLICATIONS

Seals and Sealing Handbook: pp. 199-207, Jul. 1986.

*Primary Examiner*—William A. Cuchlinski, Jr.
*Assistant Examiner*—Scott W. Cummings
*Attorney, Agent, or Firm*—Flynn, Thiel, Boutell & Tanis

[57] ABSTRACT

A sealing and stripper ring for a rod-like component has an annular support part on which a sealing lip and axially spaced from it a first stripper lip are provided. A second annular stripper lip is placed coaxially in front of the first stripper lip on the side opposite to the sealing lip. At least as regards its stripper part (which in the operational position contacts the circumferential surface of the rod-like component) the second lip is made harder or stiffer than the corresponding engagement part of the first stripper lip.

15 Claims, 2 Drawing Sheets

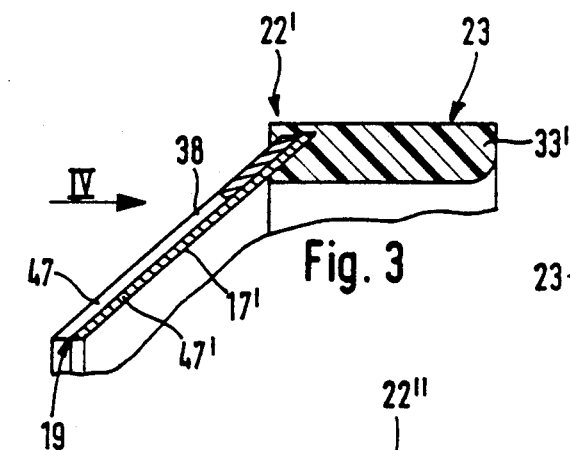
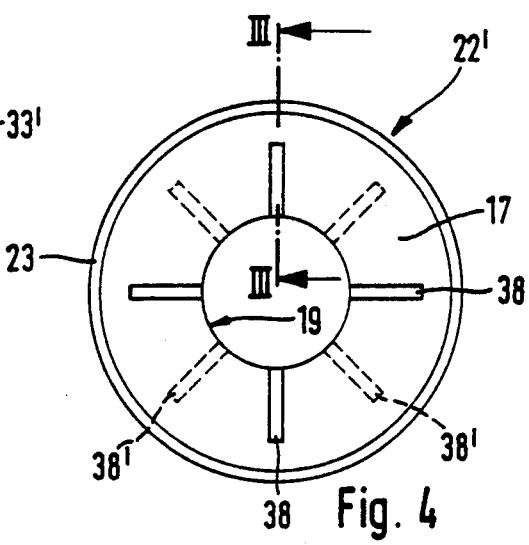
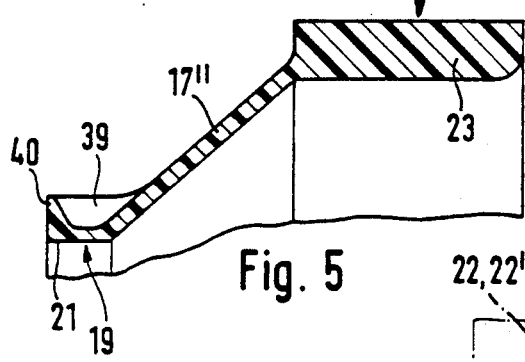
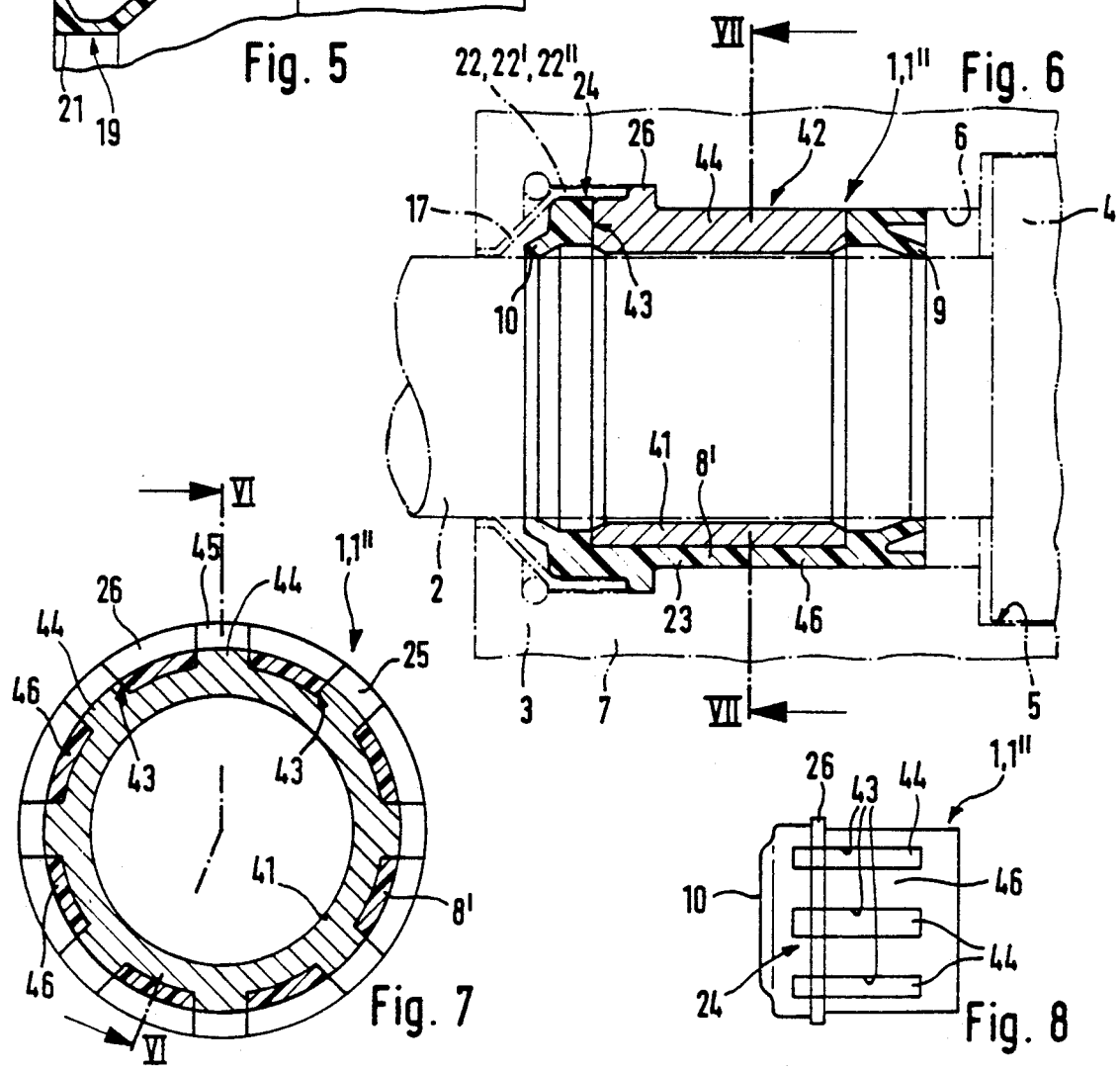
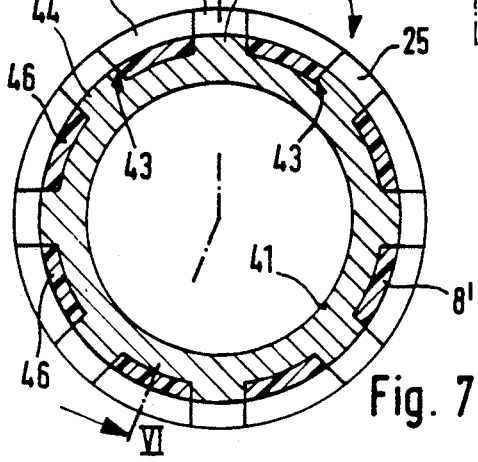
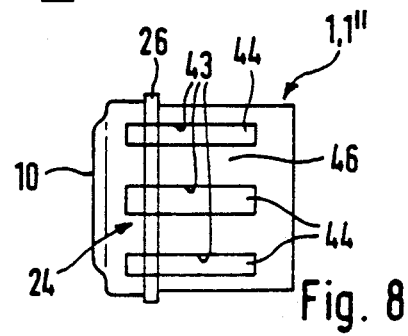

SEALING AND STRIPPER RING

FIELD OF THE INVENTION

The invention relates to a sealing and stripper ring which in the operational state is fitted around a rod-like component able to be reciprocated in relation to it and comprises an annular support part functioning to secure it to a holding member and on which a circumferential sealing lip and, axially spaced from it, a circumferential stripper lip are coaxially arranged.

BACKGROUND OF THE INVENTION

Such a sealing and stripper ring is for example described in the German patent publication 8,510,866 U. The rod-like component is in this case constituted by the piston rod of a piston and cylinder unit, whose cylinder end plate has the piston rod extending through it. The cylinder end plate constitutes the means for holding the sealing and stripper ring, which is fitted around the piston rod and has both its lips in contact with its circumferential surface. The sealing lip adjacent to the cylinder space prevents the escape of the fluid power medium necessary for the operation of the piston and cylinder unit. The stripper lip, which is arranged axially further to the outside, is intended preclude the entry of foreign matter into the cylinder space since when the piston rod is retracted into the cylinder it strips off the dirt adhering to it. The sealing and stripper ring in accordance with the invention is preferably also intended for use with piston and cylinder units.

The stripper lip will generally be subjected to heavy loads. Any particles adhering to the piston rod are likely to rapidly lead to damage thereof. Therefore in the prior art stripper lips consisting of comparatively hard material have been employed. However it has turned out that owing to its lack of elasticity such a hard lip is not intrinsically capable of stripping off very fine particles of dirt and liquid.

SHORT SUMMARY OF THE PRESENT INVENTION

Accordingly one object of the invention is to provide a sealing and stripper ring of the type initially mentioned which on the one hand has a simple design and may be fitted in an extremely simple way while nevertheless being in the position of stripping off particles adhering to the piston rod irrespectively of their size and intensity.

A further object of the invention is to provide such a sealing and stripper ring which performs such function in a manner substantially free of wear.

In order to achieve these and/or other purposes, on the side opposite to the sealing lip ahead of the stripper lip a coaxially arranged second stripper lip is provided, the second stripper lip is arranged on the support part and at least the stripper part, which in the operational condition makes contact with the circumferential surface of the rod-like component, of the second stripper lip is made harder or stiffer than the corresponding part of the axially following first stripper lip.

It is in this manner that it is possible to produce a combined sealing and stripper ring which in addition to the sealing lip has two axially consecutive stripper lips. The axially outermost second stripper lip is, at least in the part in contact with the rod-like component and preferably generally, made harder or stiffer than the middle first stripper lip. During operation the outer stripper lip consequently detaches the coarser and firmly adhering particles of foreign matter from the piston rod and owing to the hard material there is no substantial wear. The following softer or less stiff or more elastic first stripper lip then strips off the fine and very fine particle which have not been so far dislodged. It is in a position of coming into snug engagement with the circumferential surface of the rod-like component, and because the outer harder stripper lip will have already removed the coarse dirt, it is subject to a minimum degree of wear. The yielding first stripper lip is affected to generally the same extent as the sealing lip which for reasons of its sealing function also has an elastic design. Despite the multiple arrangement of the lips the configuration of the ring is extremely compact, more particularly in the axial direction, because the second stripper lip is arranged, like the first one, on the support part. This furthermore permits rapid fitting and removal of the sealing and stripper ring in accordance with the invention.

Advantageous further developments of the invention are described in the claims.

If the second stripper ring is detachably secured to the support part, it is possible for it to be rapidly replaced if necessary. This may be necessary, if the stripper ring, despite its hardness, has undergone a certain degree of wear in the course of time owing to the action of foreign matter stubbornly adhering to the piston rod. In this respect there is the possibility of renewed use of the ring unit consisting of the sealing lip and the first stripper lip reduces costs. The replacement may be performed in an extremely simple way, if in accordance with a further embodiment of the invention the second stripper ring is a component of an annular stripper detachably secured to the support part, and which may have an annular holding part with which it is able to be axially plugged or slipped over the support part.

Preferably the sealing lip, the first stripper lip and the support part are integrally designed as a single structure and consist of elastomeric synthetic resin. There is hence the advantage of simple manufacture and simultaneously of excellent sealing and stripping properties. The second stripper ring may consist of hard synthetic resin material, in which case however, at least as regards the stripping part cooperating with the rod-like component, it is convenient if additionally it has a stiffening or reinforcing means. Another advantageous possibility is the production of the second stripper lip of a metal such as stainless steel, which is extremely resistant to wear.

If the sealing and stripper ring is to simultaneously function as a sliding bearing for the rod-like component, it is convenient if in the part between the sealing lip and the first stripper lip its support part fits round and bears a rod support bushing, such bushing consisting of a material which is suitable for performing a guiding function.

It is generally possible to provide a plurality of annular strippers having the second stripper lip, which have a different lip configuration. Dependent on the particular application it is then possible for the entire stripper to be mounted in a replaceable manner on the support part bearing the two other lips. A further possibility of combination results from the selective use of a support part with or without a piston rod guiding bushing. Therefore it is possible to make up a kit of parts with which the sealing and stripper ring may be put together in accordance with the specific requirement.

BRIEF DESCRIPTION OF THE DRAWINGS

The invention will now be described in more detail with reference to the accompanying drawings, which show several working embodiments thereof, in which

FIG. 3 shows a preferred embodiment of the stripper in a longitudinal section taken on the section line III—III in accordance with FIG. 4.

FIG. 4 shows a plan view of the stripper in accordance with figure looking in the axial direction as indicated by the arrow IV.

FIG. 5 shows a further embodiment of the invention in the form of a stripper consisting completely of synthetic resin represented in a manner corresponding to FIG. 3.

FIG. 6 shows a sealing and stripper ring with a piston rod bushing in the position of use, the holding means, the rod-like component and the stripper being only shown in broken lines, and in a section taken on the line VI—VI of FIG. 7.

FIG. 7 shows a cross section taken through the sealing and stripper ring in accordance with FIG. 6 taken on the section line VII—VII.

FIG. 8 shows a plan view looking radially towards the sealing and stripper ring in accordance with FIGS. 6 and 7.

DETAILED ACCOUNT OF WORKING EMBODIMENTS OF THE INVENTION.

Figure 1:
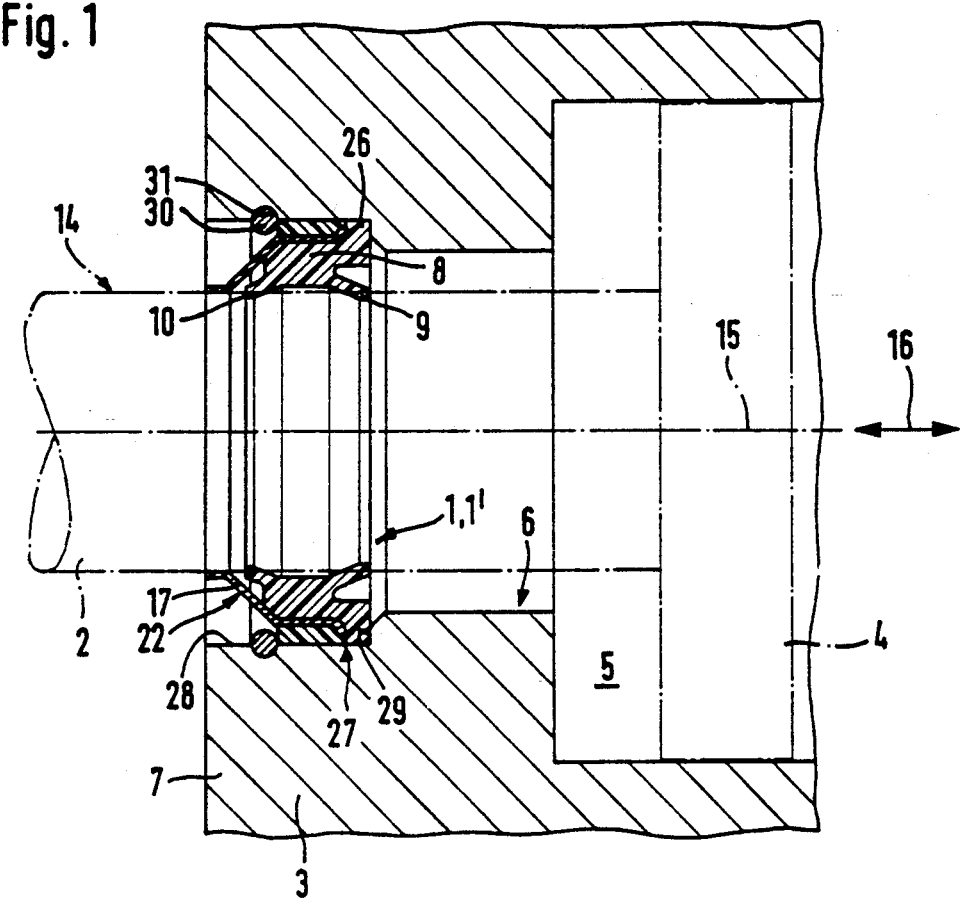
FIG. 1 shows in a longitudinal section a first design of the sealing and stripper ring on a holding means in a working position in the form of the cylinder barrel of a piston and cylinder unit, the rod-like component cooperating with the ring only being shown in broken lines.

In its operational position illustrated in FIGS. 1 and 6, for instance, the sealing and stripper ring generally referenced 1 is arranged in the passage opening of a rod-like component referenced 2 through a first component 3. The preferred field of application is in this respect in conjunction with piston and cylinder units. In the illustrated working embodiments of the invention illustrated in FIGS. 1 and 6, the rod-like component 2, which is only shown in broken lines, is constituted by a piston rod, which is connected with a piston 4, which is able to be moved axially to and fro in the cylinder space 5 of the equipment. The further component 3 is in this case constituted by the cylinder or by the end plate of the equipment and possesses a passage 6 through which the rod-like component 2 extends. In the illustrated working embodiments in accordance with FIGS. 1 and 6 it simultaneously constitutes a holding means for the sealing and stripper ring 1, which in the operational position is secured in the passage 6 on the holding means and coaxially surrounds the rod-like component 2.

The sealing and stripper ring has a combined sealing and stripper function since it prevents the escape of any fluid power medium present in the cylinder space 5 through the passage 6 and prevents the ingress of foreign matter, adhering to the rod-like component 2, from the outside, into the interior of the cylinder.

In what follows, an account will be given of the embodiment of the invention illustrated in FIGS. 1 and 2, whose sealing and stripper ring 1 and 1' has an annular support part 8, with which it is preferably detachably secured in the operational position sealingly on the holder 7. Radially to the inside on the support part 8 in the vicinity of the one axial side, which in the operational position given by way of example is turned towards the cylinder space 5, a ring-like annularly extending sealing lip 9 is coaxially arranged. It has essentially the configuration of a collar in the form of a hollow frustum of a cone and starting from the support part 8 it extends radially and axially inwardly as seen in the operational position which is illustrated by way of example.

At the opposite axial side, which in the operation position is to the outside, the support part 8 bears a first stripper lip 10. This lip as well is annular and constitutes an entire loop and is arranged coaxially in relation to the sealing lip 9. It is convenient if in this case as well the stripper lip has a configuration the same as the sealing lip so that the first stripper lip 10 extends radially obliquely inwardly and simultaneously axially outwardly.

The two lips 9 and 10 extending in opposite axial directions away from each other are arranged with a distance between them, and between them there is a circumferentially extending groove-like like recess 11. Its diameter dictates the maximum diameter of the rod-like component 2, which may be run through the passage, and which however preferably is always somewhat smaller so that there is a clearance between it and the floor of the recess. Owing to their ability to deform elastically radially or to widen out, the lips may be readily adapted to the respective diameter of the component.

The support part 8 has an annular prolongation 12 extending into the part radially outside the sealing lip 9 and between which and the sealing lip 9 there is a recess 13 circumferentially extending from the axial inner side and which renders possible outward movement of the sealing lip 9. As regards the first stripper lip 10 it is not necessary to have such structure, because this lip is arranged projecting axially past the support part 8.

When not in use, the cross section surrounded by the two lips 9 and 10 is somewhat smaller, and in the operational condition, owing to insertion of the rod-like component 5, its diameter is accordingly somewhat larger.

Preferably the support part 8 is made integral with the sealing lip 9 and the first stripper lip 10. The uniform annular member resulting from this construction as illustrated in FIGS. 1 and 2 consists of an elastomeric synthetic resin. This ensures a high degree of flexibility and excellent sealing properties. The lips 9 and 10 are in a position of making snug engagement with the circumferential surface 14 of the rod-like component 2, which is able to be reciprocated axially in relation to them. Furthermore, it is possible for the support part 8 to provide a preferably static sealing action in relation to the passage 6 in relation to the component 3 which functions as a holder.

A further provision is that the sealing and stripper ring 1 and 1' has a second stripper lip 17, which is arranged on the outer axial side, opposite to the sealing lip 9, of the first stripper lip 10 and is placed some distance in front of it. It is also made in the form of a ring and essentially has the outline of a frustum of a cone. It extends axially away from the other lips 9 and 10 and is simultaneously directed radially outwardly. As is the case with the other lips 9 and 10, the lip part 18 with the minimum diameter is provided for making running engagement with the circumferential surface 14 of the component 2 extending therethrough. In the case of the two stripper lips 10 and 17, this part 18 is constituted by a stripping part 19 and 19'.

A significant feature is that the second stripper lip 17, which in the operational condition is to the outside, is preferably generally harder or stiffer, at least as regards the stripping part 19', than the corresponding part 19 of the axially following (15) first stripper lip 10. Preferably the second stripper lip 17 generally consists of a harder and less resilient elastic material than the first stripper lip 10. In the illustrated working embodiment of the FIGS. 1 and 2 the second stripper lip 17 is in the form of a metal structure.

It is in this case that when the rod-like component 2 is moved towards the interior of the cylinder in accordance with FIG. 1, the harder outer stripper lip 17 strips foreign matter adhering to the outer circumferential surface thereof. Owing to the high resistance of the lip the stubbornly adhering particles on the rod, such as firmly adhering crystals of sugar when the unit is employed in sugar boiling equipment, are reliably wiped off. Very fine foreign matter and/or fine droplets of liquid or thin liquid films, which are not tackled by the outer stripper lip 17, are reliably retained in the following step by the elastic first stripper lip 10 which makes snug contact with the component 2. Since the coarse foreign matter does not reach this first stripper lip 10, the same is subjected to comparatively little wear despite the low degree of hardness.

In order to prevent scratching of the circumferential surface of the component 2, the second stripper lip 17 is angled adjacent to its stripping part 19' with the formation of the tubular prolongation 20, the angled part the surrounding the component 2 and making contact therewith over a wide area. In order to maintain the stripping action with a sharp condition of the stripping edge 21 it is convenient however to provide a negative slope on the free edge of the prolongation 20.

The first stripper lip 10 as well and the sealing lip 9 are preferably flattened slightly in a hollow cylindrical configuration in the part 18 in engagement with the component 2.

It is an advantage if the second stripper lip 17 is arranged in a readily replaceable manner on the support part 8. When wear has taken place, this makes for a possible cheap replacement of the second stripper lip 17 without the other components of the sealing and stripper ring 1 and 1' having to be replaced. The simple replacement and the secure placement in the operational position ensures, in all the embodiments of the invention illustrated in the figures, the possibility that the second stripper lip 17 is a part of an annular stripper 22, which is detachably arranged on the support part 8. It has an annular holding part 23, which in cross section is essentially rectangular, which extends, as illustrated in FIG. 1, axially over the support part 8 and in this respect preferably fits over it radially from the outside along a part thereof. In this respect, the essentially tubular holding part 23 takes up a position on the circumferentially extending support section 24 of the support part 8 so that its end edge 25, which is remote from its lip, abuts against an abutment part 26 (on the support part 8) projecting radially and adjoining the support part 24. It delimits the degree of slipping onto the support part 8 and is preferably in the form of a circumferentially extending collar or annular flange. In the slipped on condition the radially outward circumferential surfaces of the holding part 23 and of the abutment part 26 conveniently merge with each other and constitute a common cylindrical outer surface 27. It is in this manner that the sealing and stripper ring 1 and 1' may be inserted without the least trouble into the passage 6 with a complementary form.

As shown in FIG. 1, it is possible for the abutment part 26 to render a contribution as well to axially holding the arrangement in place in the operational position assumed by the sealing and stripper ring. The arrangement is preferably such that the sealing and stripper ring 1 and 1', in the position of use, is seated in a cylindrical recess 28, which opens on the assembly side, of the passage 6 and has the abutment part 26 in firm engagement with the connecting step 29 leading to the passage part.

The axial fixing action effective in the opposite direction is due to a holding element 30, which is detachable and fixed to the holder and which preferably is in the form of a slotted retainer ring and may be fitted in a groove 31 in the widened part 28. In this respect it bears on the axial edge part 32 (which is on the lip side) of the holding part 23 so that the latter makes firm engagement with the support part 8 and conveniently simultaneously ensures that the entire sealing and stripper ring 1 and 1' makes firm engagement with the holder 7 axially.

Figure 2:
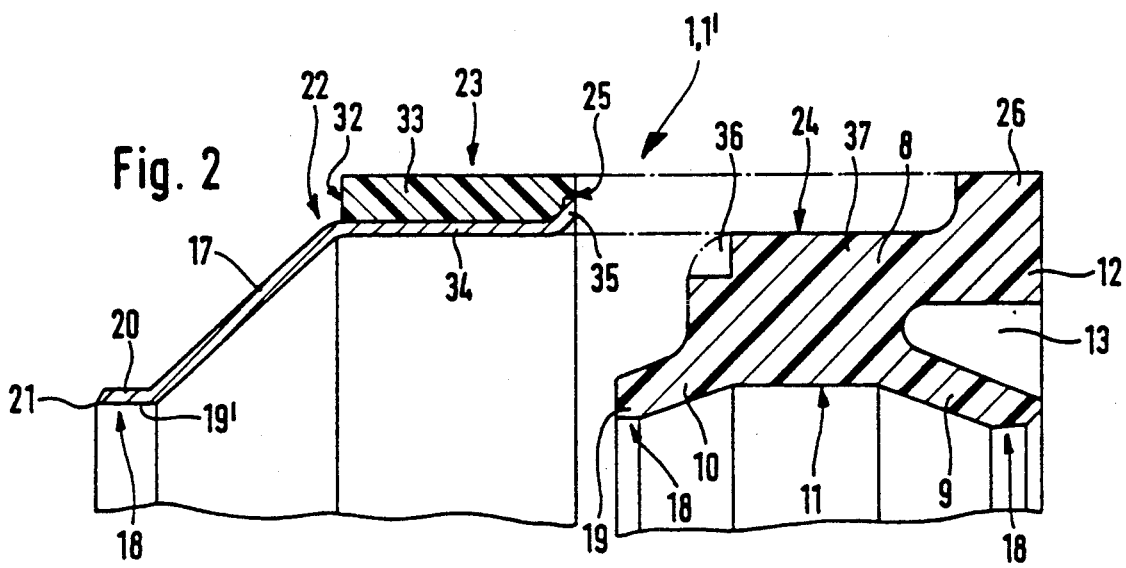
FIG. 2 shows the sealing and stripper ring part of the structure in accordance with FIG. 1 on a larger scale and after removal of the stripper.

In the illustrated working embodiment of FIGS. 1 and 2, the second stripper ring 17, which consists of metal, has an annular prolongation 34 (which adjoins the oblique lip section, is made integrally and has the form of a circular cylinder) on the axial side opposite to the stripper part 19'. The prolongation 34 belongs to the holding part 23. The latter is completed by a holder ring 33 in the form of a sleeve and able to be more particularly detachably externally slipped over the ring prolongation 34. The holding ring 33 consists more particularly of a synthetic resin such as rubber. A bent part 35 on the free end of the prolongation fits around the holding ring in order to limit the distance it may be slipped into position, the bent part 35 preferably being let into the annular edge 25. The length of the holding ring 33 is approximately the same as that of the ring prolongation 34 and more particularly functions to stiffen and hold the comparatively thin metal casting surrounding the second stripper lip 17.

The second stripper lip 17 extends axially in front of the support part 8 between the holding part 23 and the stripper part 19'. This generally leads to a good shielding effect for the elastic synthetic resin components of the sealing and stripper ring 1 and 1'. In order to ensure that the second stripper lip 17 may be arranged as near as possible to the first stripper lip 10 to ensure very compact axial dimensions, the support part 8 has a basic cross section 37 which apart from the prolongation 12 and the abutment part 26 (arranged radially to the outside on the latter) has a rectangular outline as illustrated in cross section in FIG. 2. At the terminating edge this basic section 37 is opposite to the abutment part 26, and here it is formed obliquely corresponding to the slope of the lip or it is provided with a circumferentially extending recess 36.

FIGS. 3 and 4 illustrate a stripper 22' which may be selectively utilized in place of the stripper 22 as described in the above. In this case as well the second stripper lip 17' which also consists of metal, is embedded in a holder ring 33' also consisting of synthetic resin and it is held by the same. Furthermore, in this case there is the advantageous feature that as the second stripper lip 17' two essentially flat laminated or sandwiched superposed annular elements 47 and 47' are utilized. As shown in FIG. 4, they respectively have a plurality of circumferentially spaced points of separation 38 and 38' which are open radially on the inside in the vicinity of the stripper part 19. Such gaps or points of separation 38 and 38' are preferably in the form of slots and extend linearly and radially outwards. In this respect the arrangement is such that the gaps 38 and 38' on the two sides are opposite to each other in the circumferential direction with an offset. One gap of the respective element 47 is hence always covered over by an unslotted part of the consecutively following element 47'. It is in this manner that despite the metal construction it is possible to have a certain degree of radial flexibility with the same high stripping performance.

FIG. 5 in part shows a further possible configuration of the stripper 22''. While possessing the same basic form as the strippers 22 and 22' described above, it is however made integrally and consists of comparatively hard synthetic resin material, as for instance a polymer. The holding part 23 and the second stripper lip 17'' are integral components. In order to increase the stiffness as regards the stripper part 19, it is possible for the stripper lip 17'' to be radially stiffened in the radially outward direction or to be reinforced, for which purpose for instance it is possible to provide a plurality of integrally molded on stiffening projecting parts 39, which are spaced from each other in the circumferential direction. Thus it is possible for them to be in the form of ribs or the like and for them to extend between the oblique part of the stripper lip 17'' and a circumferentially extending collar 40, which extends radially outwards adjacent to the stripper edge 21.

In principle the embodiment of the invention illustrated in FIGS. 6 through 8 is the same as those described in the above so that like parts are denoted by like reference characters. The stripper 22 is diagrammatically illustrated; it is possible to provide any one of the strippers 22, 22' and 22'' as described above selectively.

The sealing and stripper ring 1 and 1'' in accordance with FIGS. 6 through 8 function simultaneously as a bearing and as a slide support for the rod-like component 2. For this reason it has an additional element in the form of a sleeve-like guiding bushing 41, which is fitted around the component in the operational condition with play. It is surrounded by the extended support part 8' which provides an external support action so that there is a firm anchoring action on the support part 8'. The sealing lip 9 and the first stripper lip 10 are respectively arranged in front of one end surface of the rod guiding bushing 41. In this respect there is the provision that at the end part associated with the second stripper lip 17 the sealing and stripper ring 1 and 1''—apart from the absence of a sealing lip 9—is configured so as to be essentially the same as the sealing and stripper ring 1 and 1' described in the above. Therefore there is more particularly one support section 24 and one abutment part 26. Only the support part 8' now extends axially past the part with the abutment part 26 in order to finally merge with the sealing lip 9 past the rod guiding bushing 41.

In the illustrated working embodiment the rod guiding bushing 41 is very effectively held since the support part 8'' has a plurality of circumferentially spaced and axially extending slit-like gaps 43 in the part 42 surrounding the bushing 41, into which gaps the complementary rib-like projections 44 provided on the outer surface of the rod guiding bushing fit with a keying action. It is convenient if the rod guiding bushing 41 is permanently secured to the support part 8', for instance by injection molding the latter on the rod guiding bushing 41, which consists of harder synthetic resin or a metal such as sintered metal.

The opening 43 closed at the ends may extend on the side associated with the first stripper lip 10 as far as a point adjacent to the support part 24, in which case the projections 44 adjacent to the abutment part 26 may have radial projections 45 uniting them as a single ring. Furthermore the projections 44 are preferably radially flush on the outside with the rib-like connect section 46 of the support part 8' positioned between the gaps 43.

In accordance with the particular application the different components of the sealing and stipper ring 1, 1' and 1'' in accordance with the invention may be assembled together in any desired way. The component of the sealing and stripper ring without any stripping and essentially consisting of the support part 8 and 8' and the two lips may be considered as the main body, which may be selectively fitted with one of the strippers 22, 22' and 22''. These strippers are furthermore suitable for fitting on a main body fitted with a rod guiding bushing or one without any such guiding bushing. The sealing and stripper ring in accordance with the invention may furthermore be incorporated in holding means designed in accordance with the prior art so that no customized designs are necessary.

With respect to the function and the manner of operation and furthermore the type of assembly the sealing and stripper ring 1 and 1' is the same as the guiding bushing described in the above. It is only a question of the insertion of annular part, which adjoins the abutment part 26, into the passage part having a smaller diameter with a good fit.

We claim:
1. In a sealing and stripper ring assembly for use on a device having means defining a passageway therein and an elongated rod-like member supported on the device for axial reciprocal movement in the passageway and relative to the sealing and stripper ring assembly, said sealing and stripper ring assembly being received in said passageway and encircling said rod-like member, the improvement wherein said sealing and stripper ring assembly comprises:

an annular support part made of an elastomeric synthetic resin material for effecting a sealing engagement thereof with a wall of the passageway in the device, on which support part is integrally provided a radially inwardly extending annular sealing lip extending axially in a first direction and a radially inwardly extending first annular stripper lip extending axially in a second direction opposite to the first direction and oriented axially spaced from and coaxially with respect to one another and adapted to slidingly engage a peripheral surface of the rod-like member, said support part including a radially outwardly facing annular support surface;

an annular holding part having a radially inwardly facing surface peripherally and axially conforming to said radially outwardly facing support surface and adapted to be removably mounted on said support surface on said support part by axially relatively moving said holding part on to and off from said support surface of said support part, said annular holding part having an axially and radially inwardly extending second annular stripper lip thereon oriented axially spaced from and coaxially of said first annular stripper lip and adapted to slidingly engage the peripheral surface of the rod-like member; and first and second limit means for preventing relative axial movement between said holding part and said support part when said holding part is disposed on said support part, said first limit means being displaceable so as to facilitate a relative axial movement between said holding part and said support part and a removal of said holding part and said second annular stripper lip thereon.

2. The sealing and stripper ring assembly, according to claim 1, wherein said first limit means is separate from said holding part and said support part; and wherein the passageway in the device has an annular groove therein, said first limit means being received in said annular groove, said annular groove and said support part being oriented at one axial end of said support part remote from said second limit means, said holding part being oriented between said first and second limit means.

3. The sealing and stripper ring assembly according to claim 2, wherein said second limit means is defined by an abutment part integrally formed at an end on said support part remote from said one end.

4. The sealing and stripper ring assembly according to claim 3, wherein said abutment part includes an annular axially extending prolongation adapted to abut an axially facing step in the passageway.

5. The sealing and stripper ring assembly according to claim 4, wherein an axially facing surface on said prolongation and a distal end of said sealing lip terminate in a common plane oriented perpendicular to an axis of the passageway.

6. The sealing and stripper ring assembly according to claim 1, wherein said second annular stripper lip is made of a stiffer material than said elastomeric synthetic resin material.

7. The sealing and stripper ring assembly according to claim 1, wherein said second annular stripper lip and said holding part are made of different materials, said holding part being made of a synthetic resin material.

8. The sealing and stripper ring assembly according to claim 7, wherein said second annular stripper lip is integrally formed with said holding part.

9. The sealing and stripper ring assembly according to claim 8, wherein said second annular stripper lip includes reinforcing means in the form of plural axially facing, radial projections that are equidistantly, angularly spaced from one another.

10. The sealing and stripper ring assembly according to claim 9, wherein said reinforcing means are alternatingly oriented on oppositely facing sides of said second annular stripper lip.

11. The sealing and stripper ring assembly according to claim 10, wherein said reinforcing means includes a plurality of separate radially extending strips laminated to said second annular stripper lip so as to define radial gaps therebetween.

12. The sealing and stripper ring assembly according to claim 7, wherein said second annular stripper lip is made of metal.

13. The sealing and stripper ring assembly according to claim 12, wherein said metal second annular stripper lip includes an axial prolongation oriented radially inside said holding part and is sandwiched between said holding part and said support part.

14. The sealing and stripper ring assembly according to claim 1, wherein said support part includes an elongated sleevelike guide bushing through which the rod-like member extends, said first annular stripper lip and said sealing lip being oriented at opposite ends of said guide bushing.

15. The sealing and stripper ring assembly according to claim 14, wherein said guide bushing and said first annular stripper lip and said sealing lip are made of separate materials; and wherein said guide bushing includes a plurality of axially extending gaps; and wherein said material of said first annular stripper lip and said sealing lip extend in said gaps.

* * * * *